June 12, 1923.
F. C. SHIPPS
BELT
Filed May 5, 1921
1,458,553
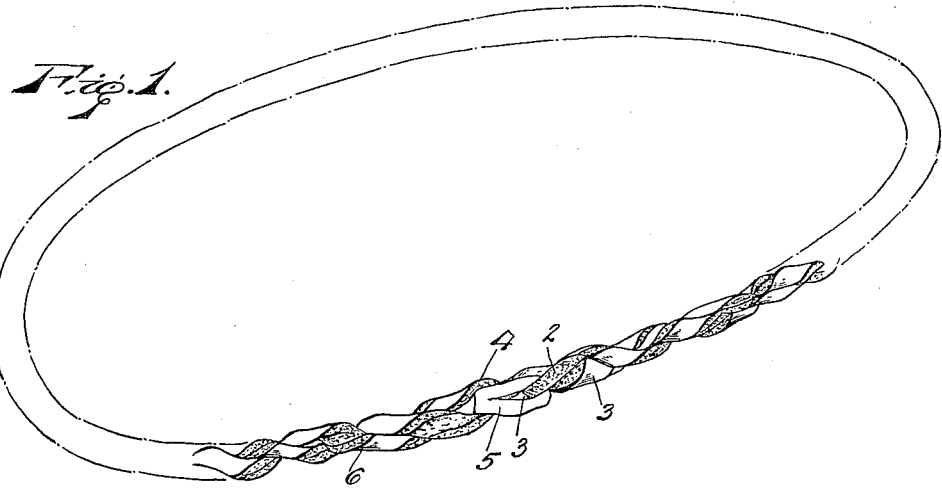
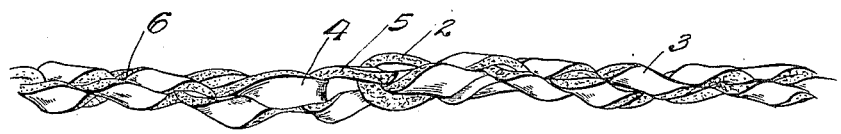
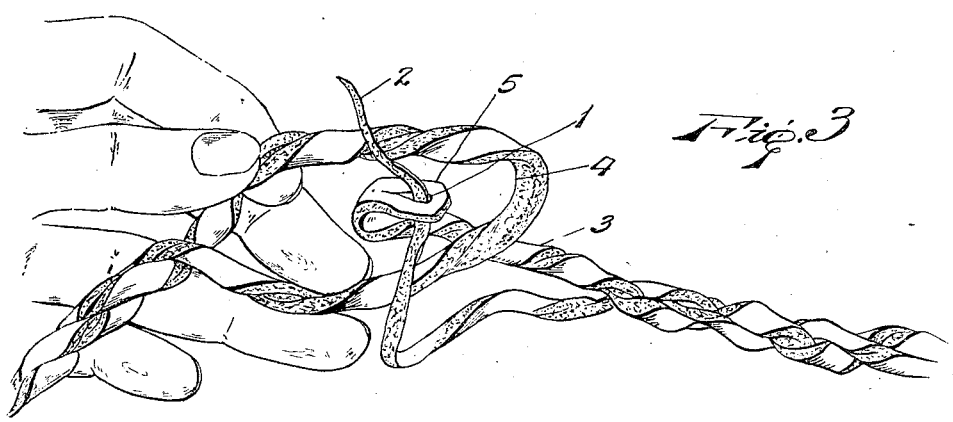
Inventor
Fred C. Shipps.
By Lacey & Lacey, Attorneys Patented June 12, 1923.

1,458,553

UNITED STATES PATENT OFFICE.

FRED C. SHIPPS, OF COSHOCTON, OHIO.

BELT.

Application filed May 5, 1921. Serial No. 467,151.

*To all whom it may concern:*

Be it known that I, FRED C. SHIPPS, a citizen of the United States, residing at Coshocton, in the county of Coshocton and State of Ohio, have invented certain new and useful Improvements in Belts, of which the following is a specification.

This invention relates to driving belts and has special reference to belts for driving the fan shafts of automobiles equipped to use round or V-shaped belts, although, of course, it is capable of use in other machines using pulleys having round or V-shaped grooves. The object of the invention is to provide a strong, durable and inexpensive belt which will prove efficient in driving a shaft or pulley and which may be produced without the use of expensive machinery. The invention is illustrated in the accompanying drawings and will be hereinafter fully set forth.

In the drawings—

Figure 1 is a perspective view showing a portion of a belt embodying my improvements;

Fig. 2 is an elevation of a portion of the belt viewed at a right angle to Fig. 1;

Fig. 3 is a view showing the adjacent portions of the belt separated at the ends of the same in order that the manner in which the ends are joined to form an endless belt may be fully disclosed.

In carrying out my invention, I employ a strip of whang leather of suitable length and in one end of said strip I form an opening 1. This opening or slot is engaged over any convenient hook or other stationary support and the free end 2 of the belt grasped by hand or clamped in any convenient twisting apparatus. The belt is then twisted upon itself so as to assume a rolled form, as indicated at 3, after which the rolled strip is doubled upon itself midway its ends so as to form a bight 4 through which the slotted end 5 may be inserted. Before inserting the end 5 containing the slot or opening 1 through the bight 4, the said end 5 is removed from the sustaining hook and the bight engaged thereover, after which the doubled strip is again twisted so that the convolutions 3 will be wrapped about and interlocked with each other, as shown at 6, the free end 2 of the strip being retained unwrapped, as shown in Fig. 3. The doubled and twisted belt is then removed from the sustaining hook and the end 5 thereof is inserted through the bight 4, as shown in the drawings, the free end 2 being then inserted through the opening or slot 1 and doubled upon itself and then twisted about and interlaced with the adjacent portion of the belt. I thus produce an endless belt which will be strong and durable and which in actual practice will stretch very slightly under continued use. The belt will fit closely within the grooved periphery of a pulley so that it will exert the required driving friction thereon, and, obviously, the ends of the belt are joined without the use of any metallic clamps or other form of fastenings which would tend to cut through and injure the leather of which the belt is formed. Moreover, should the belt stretch from long-continued use, it may be very easily shortened as in order to accomplish this result it is necessary merely to unwind the free end 2 from the portion of the belt with which it is interwoven or twisted and then draw a greater portion of said free end through the opening 1 so that the stretch will be removed. The belt is obviously very light and inexpensive and has been found highly efficient in actual use.

Having thus described the invention, what is claimed as new is:

1. A belt consisting of a strip of twisted material perforated at one end and doubled upon itself midway its ends, the perforated end of the strip being inserted through the bight produced by doubling the strip and the free end of the strip being passed through the perforated end thereof and doubled upon itself and having its free portion intertwisted with the adjacent portion of the belt, the ends of the strip lying at opposite sides of the bight thereof.

2. An endless drive belt comprising a strip of leather having a relatively broad end and a relatively narrow end, the former end being provided with a perforation, the said strip being twisted about its length and doubled upon itself midway between its ends to provide strands, and the said strands being twisted together, the relatively broad perforated end of the strip being inserted through the bight produced by doubling the strip upon itself, and the relatively narrow end of the strip being inserted through the perforation in the first-mentioned end of the strip and drawn therethrough and doubled back upon itself and having its free portion intertwisted with the said strands of the strip whereby to produce and maintain the endless form.

3. An endless drive belt comprising a single integral strip of leather doubled upon itself midway between its ends to provide strands, the strands being individually twisted about their length and also twisted together, thereby providing a bight, the free end portions of the two strands being connected together through the bight whereby to produce and maintain the endless form.

In testimony whereof I affix my signature.

FRED C. SHIPPS. [L. S.]